(12) United States Patent
Prakash et al.

(10) Patent No.: US 10,003,867 B2
(45) Date of Patent: Jun. 19, 2018

(54) DISJOINT PATH COMPUTATION SYSTEMS AND METHODS IN OPTICAL NETWORKS

(71) Applicant: Ciena Corporation, Hanover, MD (US)

(72) Inventors: Anurag Prakash, Noida (IN); Rajagopalan Kannan, Gurgaon (IN); Gaurav Bafna, Jaipur (IN)

(73) Assignee: Ciena Corporation, Hanover, MD (US)

(*) Notice: Subject to any disclaimer, the term of this patent is extended or adjusted under 35 U.S.C. 154(b) by 0 days. days.

(21) Appl. No.: 15/297,327

(22) Filed: Oct. 19, 2016

(65) Prior Publication Data

US 2018/0063608 A1    Mar. 1, 2018

(30) Foreign Application Priority Data

Aug. 31, 2016 (IN) .............................. 201611030418

(51) Int. Cl.
| | |
|---|---|
| *H04Q 11/00* | (2006.01) |
| *H04L 12/733* | (2013.01) |
| *H04L 12/721* | (2013.01) |
| *H04L 12/707* | (2013.01) |

(52) U.S. Cl.
CPC ....... *H04Q 11/0066* (2013.01); *H04L 45/122* (2013.01); *H04L 45/124* (2013.01); *H04L 45/24* (2013.01); *H04Q 2011/0073* (2013.01)

(58) Field of Classification Search
CPC .............. H04B 10/1143; H04B 10/1149; H04B 10/12; H04Q 11/0066
See application file for complete search history.

(56) References Cited

U.S. PATENT DOCUMENTS

| | | | |
|---|---|---|---|
| 8,578,054 B2 | 11/2013 | Thubert et al. | |
| 8,681,607 B2 | 3/2014 | Lu et al. | |
| 8,682,160 B2 | 3/2014 | Prakash et al. | |
| 8,854,955 B2 | 10/2014 | Prakash et al. | |

(Continued)

OTHER PUBLICATIONS

A. Doria et al., General Switch Management Protocol (GSMP) Applicability, Network Working Group, Informational Memo, The Internet Society, Jun. 2002, pp. 1-9.
E. Mannie, Generalized Multi-Protocol Label Switching (GMPLS) Architecture, Network Working Group, Standards Track Memo, The Internet Society, Oct. 2004, pp. 1-69.

(Continued)

*Primary Examiner* — Dzung Tran
(74) *Attorney, Agent, or Firm* — Clements Bernard Walker PLLC; Christopher L. Bernard; Lawrence A. Baratta, Jr.

(57) ABSTRACT

Systems and methods for computing disjoint paths in a network considering continuity constraints include, responsive to a request for disjoint paths in the network which are subject to the continuity constraints, initializing a plurality of variables associated with a graph defining the network where edges constitute nodes and vertices constitute links; determining a first path through the graph; determining an auxiliary directed graph based on the first path; and determining a second path through the auxiliary directed graph, wherein the second path is determined by considering entry into cut edges, exit from cut edges, and a destination in the auxiliary directed graph and the plurality of variables are adjusted based on the entry, the exit, and the destination to address the continuity constraints. This approach concept applies to not just continuity constraints but to any constraints, which are non-additive in nature; the objective function is still additive for Shortest Path First (SPF).

17 Claims, 17 Drawing Sheets

(56) References Cited

U.S. PATENT DOCUMENTS

| | | | |
|---|---|---|---|
| 9,100,328 B1* | 8/2015 | Atlas | H04L 45/28 |
| 9,172,658 B2 | 10/2015 | Kakkar et al. | |
| 9,407,359 B2 | 8/2016 | Swinkels et al. | |
| 2013/0177305 A1 | 7/2013 | Prakash et al. | |
| 2013/0202299 A1* | 8/2013 | Prakash | H04J 14/0257 398/51 |
| 2013/0308948 A1 | 11/2013 | Swinkels et al. | |
| 2014/0086065 A1* | 3/2014 | DeCusatis | H04L 41/0896 370/242 |
| 2015/0227453 A1* | 8/2015 | Bhattacharya | G06F 17/30958 714/38.1 |
| 2016/0037239 A1 | 2/2016 | Chhillar et al. | |
| 2016/0043797 A1 | 2/2016 | Sareen et al. | |
| 2016/0105380 A1 | 4/2016 | Chhillar et al. | |
| 2016/0173367 A1 | 6/2016 | Sareen et al. | |
| 2017/0093705 A1* | 3/2017 | Gopalan | H04L 45/70 |

OTHER PUBLICATIONS

A. Doria et al., Forwarding and Control Element Separation (ForCES) Protocol Specification, Internet Engineering Task Force (IETF), Standards Track Memo, ISSN: 2070-1721, Mar. 2010, pp. 1-124.

ITU-T, Telecommunication Standardization Sector of ITU, G.694.1, Spectral grids for WDM applications: DWDM frequency grid, Feb. 2012, pp. 1-16.

ITU-T, Telecommunication Standardization Sector of ITU, G.709/Y.1331, Interfaces for the optical transport network, Feb. 2012, pp. 1-238.

ITU-T, Telecommunication Standardization Sector of ITU, G.798, Characteristics of optical transport network hierarchy equipment functional blocks, Dec. 2012, pp. 1-390.

ITU-T, Telecommunication Standardization Sector of ITU, G.8080/Y.1304, Architecture for the automatically switched optical network, Feb. 2012, pp. 1-124.

* cited by examiner

DISJOINT PATH COMPUTATION SYSTEMS AND METHODS IN OPTICAL NETWORKS

CROSS-REFERENCE TO RELATED APPLICATION(S)

The present patent application/patent claims the benefit of priority of Indian Patent Application No. 201611030418, filed on Aug. 31, 2016, and entitled "DISJOINT PATH COMPUTATION SYSTEMS AND METHODS IN OPTICAL NETWORKS," the contents of which are incorporated in full by reference herein.

FIELD OF THE DISCLOSURE

The present disclosure generally relates to optical networking systems and methods. More particularly, the present disclosure relates to disjoint path computation systems and methods in optical networks which determine a pair of disjoint (separate) paths for providing resiliency in connections.

BACKGROUND OF THE DISCLOSURE

Routing and Wavelength Assignment (RWA) is a well-known problem for fixed grid optical networks while Routing and Spectrum Assignment (RSA) is its equivalent term to the same problem for flexible grid optical networks or gridless optical networks. In fixed grid optical networks, wavelengths are spaced apart from each other according to a wavelength spectrum grid defined by International Telecommunication Union (ITU) in ITU-T G.694.1 (February 2012), "Spectral grids for WDM applications: DWDM frequency grid," the contents of which are incorporated by reference. In flexible grid optical networks, which is also described in ITU Recommendation G.694.1 "Spectral grids for WDM applications: DWDM frequency grid" (February 2012), each signal can be allocated to spectrum with different widths optimized for the bandwidth requirements of the particular bit rate and modulation scheme of the individual channels. Note, flexible grid networks may still utilize a grid, albeit at a much finer granularity than grid networks (e.g., 6.25 GHz vs. 50 GHz). On the other hand, gridless networks have no such grid constraints. The ultimate objective of RWA or RSA is to find a wavelength or spectrum assignment on a route for a particular channel in the optical network, such assignment and routing being optimal in some manner. In the case of disjoint path computation, an objective is to find the shortest path of such routes with spectrum continuity.

In an optical network, path computation relates to finding a path given some criteria between two nodes in the optical network. A disjoint path computation includes determining two different paths which are separate (i.e., disjoint) for resiliency. Suurballe's algorithm is an algorithm for finding two disjoint paths in a non-negatively-weighted directed graph so that both paths connect the same pair of vertices and have minimum total length. The main idea of Suurballe's algorithm is to use Dijkstra's algorithm to find one path, to modify the weights of the graph edges, and then to run Dijkstra's algorithm a second time. The modification to the weights is similar to the weight modification in Johnson's algorithm and preserves the non-negativity of the weights while allowing the second instance of Dijkstra's algorithm to find the correct second path. However, for DWDM networks, there is an additional constraint of wavelength/spectral continuity for fixed grid or flexible grid networks, i.e., in DWDM networks, each link in a path must be on a same wavelength or portion of the spectrum. Due to this additional constraint, Suurballe's algorithm may not yield a feasible or optimal solution for spectrum continuity constraints.

To address this additional constraint of wavelength continuity, some existing solutions include. First, one approach is to apply spectrum continuity along with each Dijkstra iteration or after the two Dijkstra iterations in Suurballe's algorithm, but this can yield either infeasible solutions or no solution when one may exist. Another approach includes dividing the optical network into 128 networks for each wavelength in the 50 GHz grid and then evaluate for each combination to get the optimal solution which may include 128×128=4096 iterations of Suurballe's algorithm to get a optimal feasible solution. Conversely, for flexible grid networks, one approach includes dividing the network into 768 networks for each portion of the spectrum in 6.25 GHz increments and then evaluate for each combination to get the optimal solution which may be a 768×768=590K iterations of Suurballe's algorithm to get a optimal feasible solution. Thus, there are a very high number of iterations based on the resolution of flexible grid networks. Of course, these approaches are computationally complex, inefficient, slow, etc. with a high-performance penalty for a correct solution in some cases and no solution in gridless networks due to a continuous spectral range without any grid slots.

There is a need for efficient disjoint path computation systems and methods in optical networks which determine a pair of disjoint (separate) paths for providing resiliency in connections.

BRIEF SUMMARY OF THE DISCLOSURE

In an exemplary embodiment, a computer-implemented method for computing disjoint paths in a network considering continuity constraints includes, responsive to a request for disjoint paths in the network which are subject to the continuity constraints, initializing a plurality of variables associated with a graph defining the network where edges constitute nodes and vertices constitute links; determining a first path through the graph; determining an auxiliary directed graph based on the first path; and determining a second path through the auxiliary directed graph, wherein the second path is determined by considering entry into cut edges, exit from cut edges, and a destination in the auxiliary directed graph and the plurality of variables are adjusted based on the entry, the exit, and the destination to address the continuity constraints. The continuity constraints can include one of wavelength and spectrum continuity in the network. The computer-implemented method can further include returning no solution if the first path does not exist. The determining the first path and determining the second path can utilize Shortest Path First (SPF). The plurality of variables can include a set of Continuity Constraints (CT) for each of paths $CT_1$, $CT_2$, and wherein the set of CT are modified traversing the auxiliary directed graph during the determining the second path, and subsequent to reaching the destination, if the set of CT are not empty, the set of CT form the disjoint paths. The first path can be determined using a Non-Viable Segment without the continuity constraints to yield the first path, $P_1$, and a tree, T, and wherein the auxiliary directed graph can be determined by applying weight modifications to the tree, T, and reversing edges of the first path, $P_1$. An alternating path and cut edges can be used to apply the continuity constraints for both the disjoint paths during the determining the second path. The computer-implemented method can further include, if no solution is found, reiterating the first path using an updated Non-Viable Segment. The continuity constraints can be applied only amongst alternating path segments of the first path and the second path.

In another exemplary embodiment, an apparatus adapted to compute disjoint paths in a network considering continuity constraints includes circuitry adapted to initialize a plurality of variables associated with a graph defining the network where edges constitute nodes and vertices constitute links responsive to a request for disjoint paths in the network which are subject to the continuity constraints; circuitry adapted to determine a first path through the graph; circuitry adapted to determine an auxiliary directed graph based on the first path; and circuitry adapted to determine a second path through the auxiliary directed graph, wherein the second path is determined by considering entry into cut edges, exit from cut edges, and a destination in the auxiliary directed graph and the plurality of variables are adjusted based on the entry, the exit, and the destination to address the continuity constraints. The continuity constraints can include one of wavelength and spectrum continuity in the network. The first path and the second path can be determined using Shortest Path First (SPF). The plurality of variables can include a set of Continuity Constraints (CT) for each of paths $CT_1$, $CT_2$, and wherein the set of CT are modified traversing the auxiliary directed graph during the determining the second path, and subsequent to reaching the destination, if the set of CT are not empty, the set of CT form the disjoint paths. The first path can be determined using a Non-Viable Segment without the continuity constraints to yield the first path, $P_1$, and a tree, T, and wherein the auxiliary directed graph can be determined by applying weight modifications to the tree, T, and reversing edges of the first path, $P_1$. The apparatus can further include circuitry adapted to reiterate the first path using an updated Non-Viable Segment if no solution is found.

In a further exemplary embodiment, a system adapted to compute disjoint paths in a network considering continuity constraints includes a network interface and a processor communicatively coupled to one another; and memory storing instructions that, when executed, cause the processor to, responsive to a request, via the network interface, for disjoint paths in the network which are subject to the continuity constraints, initialize a plurality of variables associated with a graph defining the network where edges constitute nodes and vertices constitute links, determine a first path through the graph, determine an auxiliary directed graph based on the first path, and determine a second path through the auxiliary directed graph, wherein the second path is determined by considering entry into cut edges, exit from cut edges, and a destination in the auxiliary directed graph and the plurality of variables are adjusted based on the entry, the exit, and the destination to address the continuity constraints. The continuity constraints can include one of wavelength and spectrum continuity in the network. The plurality of variables can include a set of Continuity Constraints (CT) for each of paths $CT_1$, $CT_2$, and wherein the set of CT are modified traversing the auxiliary directed graph during the determining the second path, and subsequent to reaching the destination, if the set of CT are not empty, the set of CT form the disjoint paths. The first path can be determined using a Non-Viable Segment without the continuity constraints to yield the first path, $P_1$, and a tree, T, and wherein the auxiliary directed graph can be determined by applying weight modifications to the tree, T, and reversing edges of the first path, $P_1$. The memory storing instructions that, when executed, can further cause the processor to, if no solution is found, reiterating the first path using an updated Non-Viable Segment.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
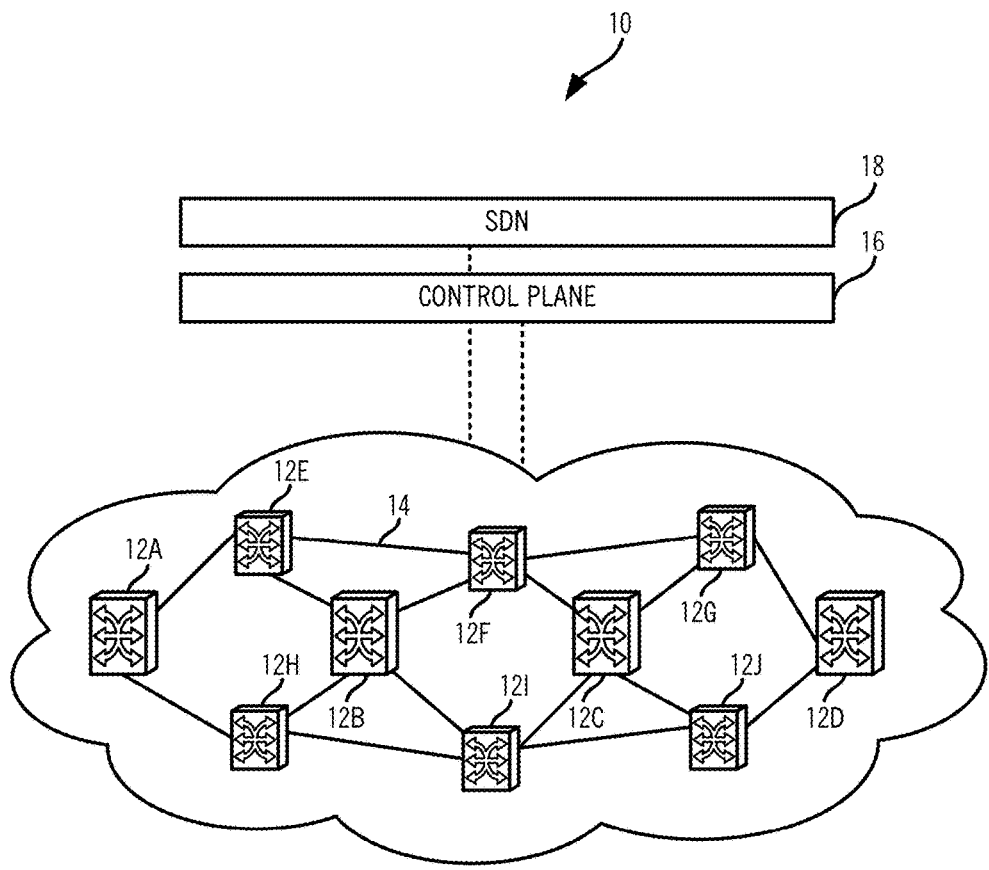
FIG. 1 is a network diagram of an exemplary network with various interconnected nodes for describing the control plane routing systems and methods for pervasive maintenance.

Again, in various exemplary embodiments, the present disclosure relates to disjoint path computation systems and methods in optical networks which determine a pair of disjoint (separate) paths for providing resiliency in connections. The systems and methods consider the constraints of wavelength continuity based on a modified Suurballe's algorithm. The problem is simply defined as: "Given a graph G(V, E) (V=vertices, E=edge), a disjoint shortest pair by Suurballe's algorithm may not yield a feasible or optimal solution for spectrum continuity constraints when one could exist." This can be proved via contradiction—for spectral continuity constraints, look for a maximal spectral continuity existence on a path, given the spectrum required. A simple application of continuity constraints during the two Dijkstra iterations (as part of Suurballe's algorithm) is not a valid solution, since the step of removing overlapping edges in the Suurballe's algorithm makes the pre-computed spectral continuity non-maximal (since removing a constraint can either make the solution better or keep it same) thus contradicting the objective of achieving maximal continuity constraint.

Calculation of disjoint paths is a requirement for DWDM networks for purposes of providing a resilient network with protection switching capability to higher layers. This application provides a solution to the problem of finding optimal disjoint routes and corresponding spectrum/wavelengths available on the same with spectrum continuity constraint. The systems and methods overcome the above problems associated with the additional constraint of wavelength/spectral continuity and provide a deterministic approach to evaluating a disjoint shortest pair of paths abiding with RWA and RSA constraints in grid-based or gridless networks.

The disjoint path computation systems and methods can be used in flexible grid (flex grid) networks or gridless networks to find disjoint paths for Media Channels (MC) and Network Media Channels (NMC). Further, the systems and methods can be used in fixed grid networks to find disjoint paths. Also, the systems and methods can be used in Contention-less Direction-less and Color-less (CDC) networks where flexibility is higher leading to more constraints.

Again, Suurballe's algorithm provides a disjoint pair in a weighted graph. It applies two path computations as sub-steps. However, it may fail for spectrum continuity if applied directly or even with spectrum continuity constraints applied in path computation. The systems and methods include modifications to support the spectrum continuity constraints, including 1) use of non-viable path in a first path computation in Suurballe's algorithm, 2) use of alternating path and cut edges to apply spectrum continuity constraints for first and second routes during a second path computation; 3) if no solution is found, then reiterate with an updated non-viable path set. Thus, the systems and methods use Suurballe's algorithm with modifications to create an auxiliary graph for the second path computation.

The systems and methods converge to a feasible, optimal solution. There is no requirement to run all the iterations; the systems and methods provide a solution set with a minimal number of iterations. Thus, the systems and methods are a greedy approach to solving the problem. Another aspect of the problem is defined as the mechanism to apply Link constraints which are non-integral (non-comparable) in nature such as spectral continuity during Suurballe's algorithm. The systems and method include an approach on how to apply such constraints in Suurballe's algorithm. Note, for DWDM networks, the constraints are spectrum continuity, but this could be any non-integral constraint in other applications of Suurballe's algorithm. The systems and methods resolve to find cut-edges and corresponding alternating path segments during each Dijkstra run in Suurballe's algorithm. The systems and methods can also be applied to node disjoint computation by simply applying the mentioned principles on the dual or Line graph of the original network graph.

Exemplary Network

Figure 2:
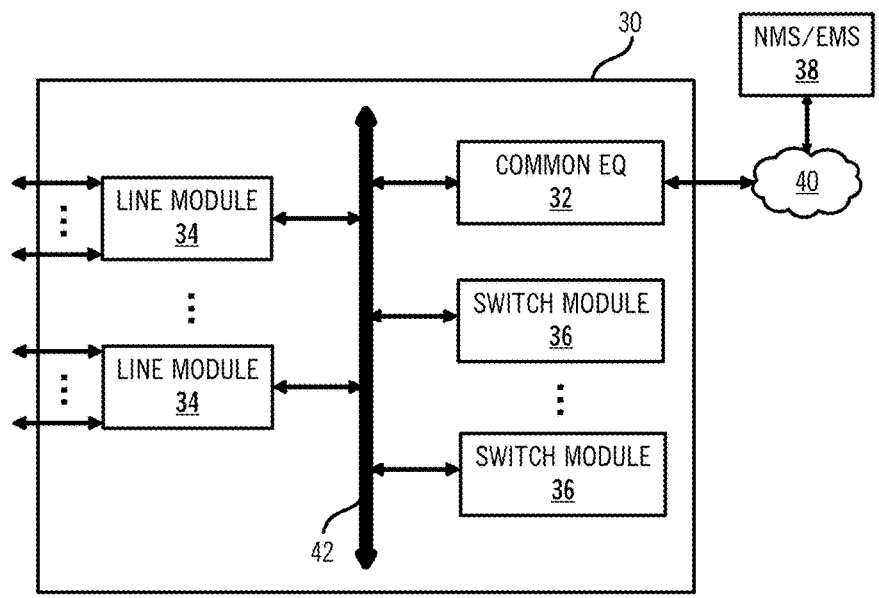
FIG. 2 is a block diagram of an exemplary node for use with the systems and methods described herein.

Referring to FIG. 1, in an exemplary embodiment, a network diagram illustrates an exemplary network 10 with various interconnected nodes 12 (illustrated as nodes 12A-12J) for describing the disjoint path computation systems and methods. The nodes 12 are interconnected by a plurality of links 14. The nodes 12 communicate with one another over the links 14 through Layer 0 (L0) such as Dense Wavelength Division Multiplexing (DWDM), Layer 1 (L1) such as Optical Transport Network (OTN), Layer 2 (L2) such as Ethernet, Multiprotocol Label Switching (MPLS), etc., Layer 3 (L3) protocols, and/or combinations thereof. For the disjoint path computation systems and methods, the links 14 include DWDM (L0) and optionally OTN (L1) or some other Time Division Multiplexing (TDM) protocol over DWDM. The nodes 12 can be network elements which include a plurality of ingress and egress ports forming the links 14. An exemplary node implementation is illustrated in FIG. 2. The network 10 can include various services or calls between the nodes 12. Each service or call can be at any of the L0, L1, L2, and/or L3 protocols, such as a wavelength, a Subnetwork Connection (SNC), a Label Switched Path (LSP), etc., and each service or call is an end-to-end path or an end-to-end signaled path and from the view of the client signal contained therein, it is seen as a single network segment. The nodes 12 can also be referred to interchangeably as network elements (NEs). The network 10 is illustrated, for example, as an interconnected mesh network, and those of ordinary skill in the art will recognize the network 10 can include other architectures, with additional nodes 12 or with fewer nodes 12, etc. as well as with various different interconnection topologies and architectures.

The network 10 can include a control plane 16 operating on and/or between the nodes 12. The control plane 16 includes software, processes, algorithms, etc. that control configurable features of the network 10, such as automated discovery of the nodes 12, capacity on the links 14, port availability on the nodes 12, connectivity between ports; dissemination of topology and bandwidth information between the nodes 12; calculation and creation of paths for calls or services; network level protection and restoration; and the like. In an exemplary embodiment, the control plane 16 can utilize Automatically Switched Optical Network (ASON) as defined in G.8080/Y.1304, Architecture for the automatically switched optical network (ASON) (February 2005), the contents of which are herein incorporated by reference; Generalized Multi-Protocol Label Switching (GMPLS) Architecture as defined in Request for Comments (RFC): 3945 (October 2004) and the like, the contents of which are herein incorporated by reference; Optical Signaling and Routing Protocol (OSRP) which is an optical signaling and routing protocol from Ciena Corporation similar to PNNI (Private Network-to-Network Interface) and MPLS; or any other type control plane for controlling network elements at multiple layers, and establishing and maintaining connections between nodes. Those of ordinary skill in the art will recognize the network 10 and the control plane 16 can utilize any type of control plane for controlling the nodes 12 and establishing, maintaining, and restoring calls or services between the nodes 12.

A Software Defined Networking (SDN) controller 18 can also be communicatively coupled to the network 10 through one or more of the nodes 12. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 18 knowing a full network topology through configuration or through the use of a controller-based discovery process in the network 10. The SDN controller 18 differs from a management system in that it controls the forwarding behavior of the nodes 12 only, and performs control in real time or near real time, reacting to changes in services requested, network traffic analysis and network changes such as failure and degradation. Also, the SDN controller 18 provides a standard northbound interface to allow applications to access network resource information and policy-limited control over network behavior or treatment of application traffic. The SDN controller 18 sends commands to each of the nodes 12 to control matching of data flows received and actions to be taken, including any manipulation of packet contents and forwarding to specified egress ports. Examples of SDN include OpenFlow (www.opennetworking.org), General Switch Management Protocol (GSMP) defined in RFC 3294 (June 2002), and Forwarding and Control Element Separation (ForCES) defined in RFC 5810 (March 2010), the contents of all are incorporated by reference herein.

Note, the network 10 can use the control plane 16 separately from the SDN controller 18. Conversely, the network 10 can use the SDN controller 18 separately from the control plane 16. Also, the control plane 16 can operate in a hybrid control mode with the SDN controller 18. In this scheme, for example, the SDN controller 18 does not necessarily have a complete view of the network 10. Here, the control plane 16 can be used to manage services in conjunction with the SDN controller 18. The SDN controller 18 can work in conjunction with the control plane 16 in the sense that the SDN controller 18 can make the routing decisions and utilize the control plane 16 for signaling thereof. In the terminology of ASON and OSRP, SNCs are end-to-end signaled paths or calls since from the point of view of a client signal; each is a single network segment. In GMPLS, the connections are an end-to-end path referred to as LSPs. In SDN, such as in OpenFlow, services are called "flows." In the various descriptions herein, reference is made to SNC or SNCP for illustration only of an exemplary embodiment of the systems and methods. Those of ordinary skill in the art will recognize that SNCs, LSPs, flows, or any other managed service in the network can be used with the systems and methods described herein for end-to-end paths. Also, as described herein, the term services is used for generally describing connections such as SNCs, LSPs, flows, etc. in the network 10. Note, the control plane 16 and the SDN controller 18 are one exemplary application of the disjoint path computation systems and methods. Those of ordinary skill in the art will recognize the disjoint path computation systems and methods can apply to any network with non-integral constraints, such as DWDM networks with spectrum continuity as a constraint.

Exemplary Network Element/Node

Referring to FIG. 2, in an exemplary embodiment, a block diagram illustrates an exemplary node 30 for use with the systems and methods described herein. In an exemplary embodiment, the exemplary node 30 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another exemplary embodiment, the node 30 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the node 30 can be any digital system with ingress and egress digital signals and switching of channels, timeslots, tributary units, etc. While the node 30 is generally shown as an optical network element, the systems and methods contemplated for use with any switching fabric, network element, or network based thereon.

In an exemplary embodiment, the node 30 includes common equipment 32, one or more line modules 34, and one or more switch modules 36. The common equipment 32 can include power; a control module; operations, administration, maintenance, and provisioning (OAM&P) access; user interface ports; and the like. The common equipment 32 can connect to a management system 38 through a data communication network 40 (as well as a Path Computation Element (PCE), SDN controller, OpenFlow controller, etc.). The management system 38 can include a network management system (NMS), element management system (EMS), or the like. Additionally, the common equipment 32 can include a control plane processor, such as a controller 50 illustrated in FIG. 3 configured to operate the control plane as described herein. The node 30 can include an interface 42 for communicatively coupling the common equipment 32, the line modules 34, and the switch modules 36 to one another. For example, the interface 42 can be a backplane, midplane, a bus, optical or electrical connectors, or the like. The line modules 34 are configured to provide ingress and egress to the switch modules 36 and to external connections on the links to/from the node 30. In an exemplary embodiment, the line modules 34 can form ingress and egress switches with the switch modules 36 as center stage switches for a three-stage switch, e.g. a three-stage Clos switch. Other configurations and/or architectures are also contemplated. The line modules 34 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, Flexible Ethernet, etc.

Further, the line modules 34 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between as well as future higher rates. The line modules 34 can include wavelength division multiplexing interfaces, short reach interfaces, and the like, and can connect to other line modules 34 on remote network elements, end clients, edge routers, and the like, e.g. forming connections on the links in the network 10. From a logical perspective, the line modules 34 provide ingress and egress ports to the node 30, and each line module 34 can include one or more physical ports. The switch modules 36 are configured to switch channels, timeslots, tributary units, packets, etc. between the line modules 34. For example, the switch modules 36 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; and the like. Specifically, the switch modules 36 can include Time Division Multiplexed (TDM) (i.e., circuit switching) and/or packet switching engines. The switch modules 36 can include redundancy as well, such as 1:1, 1:N, etc. In an exemplary embodiment, the switch modules 36 provide OTN switching and/or Ethernet switching.

Those of ordinary skill in the art will recognize the node 30 can include other components which are omitted for illustration purposes, and that the systems and methods described herein are contemplated for use with a plurality of different network elements with the node 30 presented as an exemplary type of network element. For example, in another exemplary embodiment, the node 30 may not include the switch modules 36, but rather have the corresponding functionality in the line modules 34 (or some equivalent) in a distributed fashion. For the node 30, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 30 is merely presented as one exemplary node 30 for the systems and methods described herein.

Exemplary Controller

Figure 3:
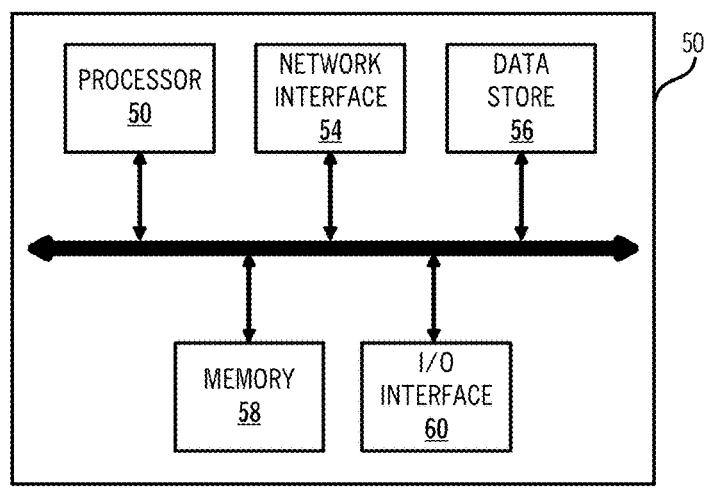
FIG. 3 is a block diagram of a controller to provide control plane processing and/or operations, administration, maintenance, and provisioning (OAM&P) for the node, and/or to implement a Software Defined Networking (SDN) controller.

Referring to FIG. 3, in an exemplary embodiment, a block diagram illustrates a controller 50 to provide control plane processing and/or operations, administration, maintenance, and provisioning (OAM&P) for the node 30, and/or to implement a Software Defined Networking (SDN) controller. The controller 50 can be part of the common equipment, such as common equipment 32 in the node 30, or a stand-alone device communicatively coupled to the node 30 via the DCN 40. In a stand-alone configuration, the controller 50 can be an SDN controller, an NMS, a PCE, etc. The controller 50 can include a processor 52 which is a hardware device for executing software instructions such as operating the control plane. The processor 52 can be any custom made or commercially available processor, a central processing unit (CPU), an auxiliary processor among several processors associated with the controller 50, a semiconductor-based microprocessor (in the form of a microchip or chip set), or generally any device for executing software instructions. When the controller 50 is in operation, the processor 52 is configured to execute software stored within the memory, to communicate data to and from the memory, and to generally control operations of the controller 50 pursuant to the software instructions. The controller 50 can also include a network interface 54, a data store 56, memory 58, an I/O interface 60, and the like, all of which are communicatively coupled to one another and to the processor 52.

The network interface 54 can be used to enable the controller 50 to communicate on the DCN 40, such as to communicate control plane information to other controllers, to the management system 38, to the nodes 30, and the like. The network interface 54 can include, for example, an Ethernet card (e.g., 10BaseT, Fast Ethernet, Gigabit Ethernet) or a wireless local area network (WLAN) card. The network interface 54 can include address, control, and/or data connections to enable appropriate communications on the network. The data store 56 can be used to store data, such as control plane information, provisioning data, OAM&P data, etc. The data store 56 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 56 can incorporate electronic, magnetic, optical, and/or other types of storage media. The memory 58 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 58 may incorporate electronic, magnetic, optical, and/or other types of storage media. Note that the memory 58 can have a distributed architecture, where various components are situated remotely from one another, but may be accessed by the processor 52. The I/O interface 60 includes components for the controller 50 to communicate with other devices. Further, the I/O interface 60 includes components for the controller 50 to communicate with the other nodes, such as using overhead associated with OTN signals.

In an exemplary embodiment, the controller 50 is configured to communicate with other controllers 50 in the network 10 to operate the control plane for control plane signaling. This communication may be either in-band or out-of-band. For SONET networks and similarly for SDH networks, the controllers 50 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 50 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels may be used for in-band signaling or routing to carry control plane traffic. Other mechanisms are also contemplated for control plane signaling.

The controller 50 is configured to operate the control plane 16 in the network 10. That is, the controller 50 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 50 can include a topology database that maintains the current topology of the network 10 based on control plane signaling (e.g., HELLO messages) and a connection database that maintains available bandwidth on the links 14 again based on the control plane signaling. Again, the control plane is a distributed control plane; thus, a plurality of the controllers 50 can act together to operate the control plane using the control plane signaling to maintain database synchronization. In source-based routing, the controller 50 at a source node for a connection is responsible for path computation and establishing by signaling other controllers 50 in the network 10, such as through a SETUP message. For example, the source node and its controller 50 can signal a path through various techniques. As described herein, the connection refers to a signaled, end-to-end connection such as an SNC, SNCP, LSP, etc. which are generally a service. Path computation generally includes determining a path, i.e. traversing the links through the nodes from the originating node to the destination node based on a plurality of constraints such as administrative weights on the links, bandwidth availability on the links, etc.

In an exemplary embodiment, the controller 50 can be configured, through the control plane 16, to implement the disjoint path computation systems and methods. In another exemplary embodiment, the controller 50 can be a PCE configured to implement the disjoint path computation systems and methods. Various other implementations are also contemplated for implementing the disjoint path computation systems and methods.

Disjoint Path Computation

A disjoint shortest pair computation is well known based on network flow principles. Again, for DWDM networks, the same computation does not take care of wavelength continuity in fixed grid and spectrum continuity in flex grid networks. The systems and methods described herein provide an approach to consider these constraints based on a modified Suurballe's algorithm. Again, the problem is defined as "given a graph G(V,E), a disjoint shortest pair by Suurballe's algorithm may not yield a feasible or optimal solution for spectrum continuity constraints when one could exist." For continuity constraints, the systems and methods look for maximal spectral continuity existence on a path, given the spectrum required. A simple application of continuity constraints during the two Dijkstra iterations (as part of Suurballe's algorithm) is not a valid solution, since the step of removing reversed edges in Suurballe's algorithm yields non-maximal continuity constraints, thus invalidating the above solution.

Suurballe's algorithm basically involves two steps using Dijkstra's algorithm. To begin describing Suurballe's algorithm, let G be a weighted directed graph containing a set V of n vertices and a set E of m directed edges; let s be a designated source vertex in G, and let t be a designated destination vertex. Let each edge (u, v) in E, from vertex u to vertex v, have a non-negative cost w(u, v). Define d(s, u) to be the cost of the shortest path to vertex u from vertex s in the shortest path tree rooted at s. In terms of the network 10, vertices are the nodes 12 and edges are the links 14. The output provides a disjoint pair of paths between the nodes 12 designated by the edges s, t.

Conventional operation of Suurballe's algorithm includes steps of:

First, find the shortest path tree T rooted at node s by running Dijkstra's algorithm. This tree contains for every vertex u, the shortest path from s to u. Let $P_1$ be the shortest cost path from s to t. The edges in T are called tree edges, and the remaining edges are called non-tree edges.

Second, modify the cost of each edge in the graph by replacing the cost w(u, v) of every edge (u, v) by w'(u, v)=w(u, v)−d(s, v)+d(s, u). According to the resulting modified cost function, all tree edges have a cost of 0, and non-tree edges have a non-negative cost.

Third, create a residual graph '$G_t$ formed from G by removing the edges of G on path $P_1$ that are directed into s and then reverse the direction of the zero length edges along path $P_1$.

Fourth, find the shortest path $P_2$ in the residual graph $G_t$ by running Dijkstra's algorithm.

Finally, discard the reversed edges of $P_2$ from both paths. The remaining edges of $P_1$ and $P_2$ form a subgraph with two outgoing edges at s, two incoming edges at t, and one incoming and one outgoing edge at each remaining vertex. Therefore, this subgraph includes two edge-disjoint paths from s to t and possibly some additional (zero-length) cycles. Return the two disjoint paths from the subgraph.

Disjoint Path Computation—DWDM Problem Definition

Figure 4:
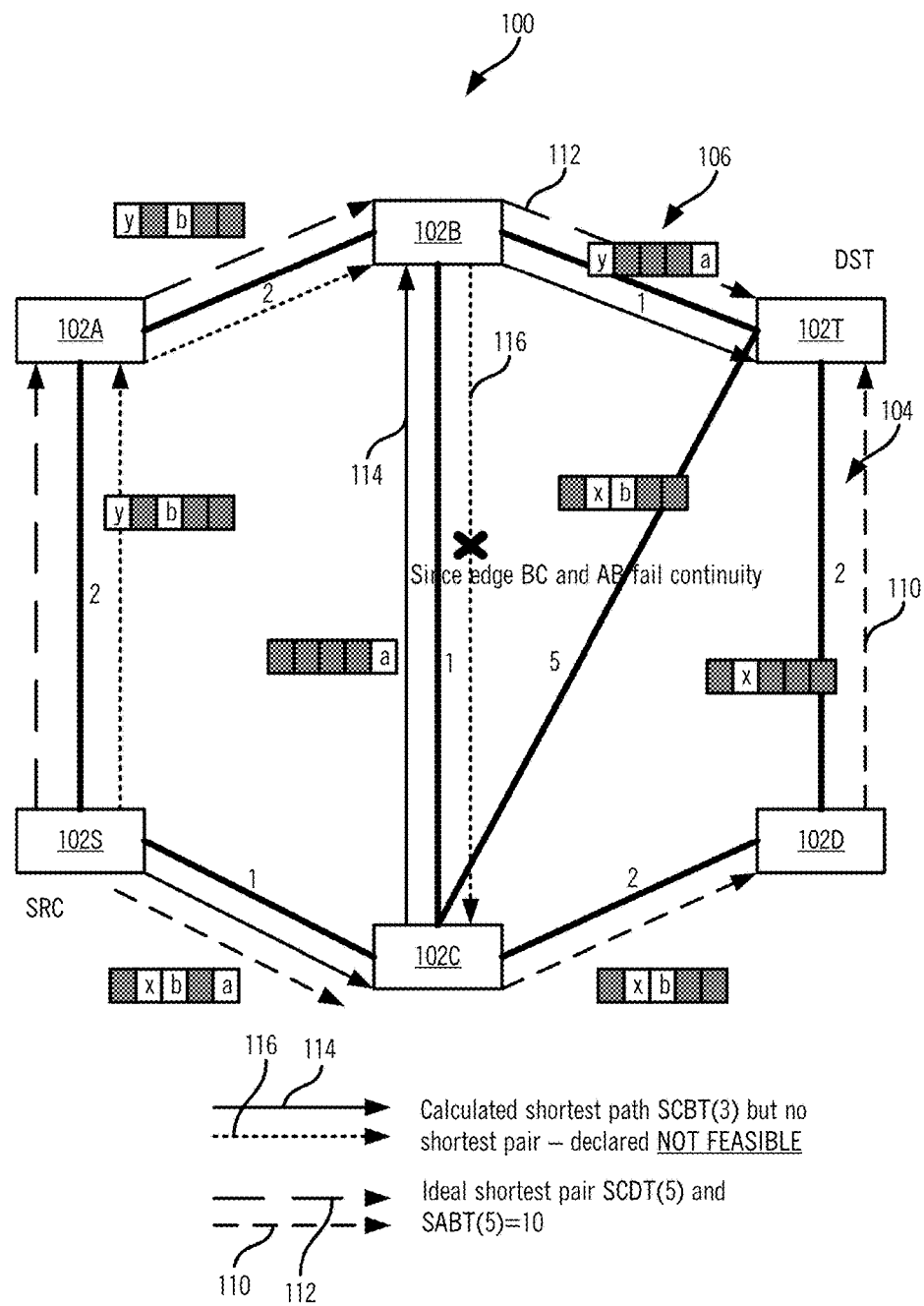
FIGS. 4, 5, and 6 are network diagrams of a network with interconnected nodes for describing disjoint path computation in an optical network; the links constitute edges and the nodes in the constitute network vertices.
Figure 5:
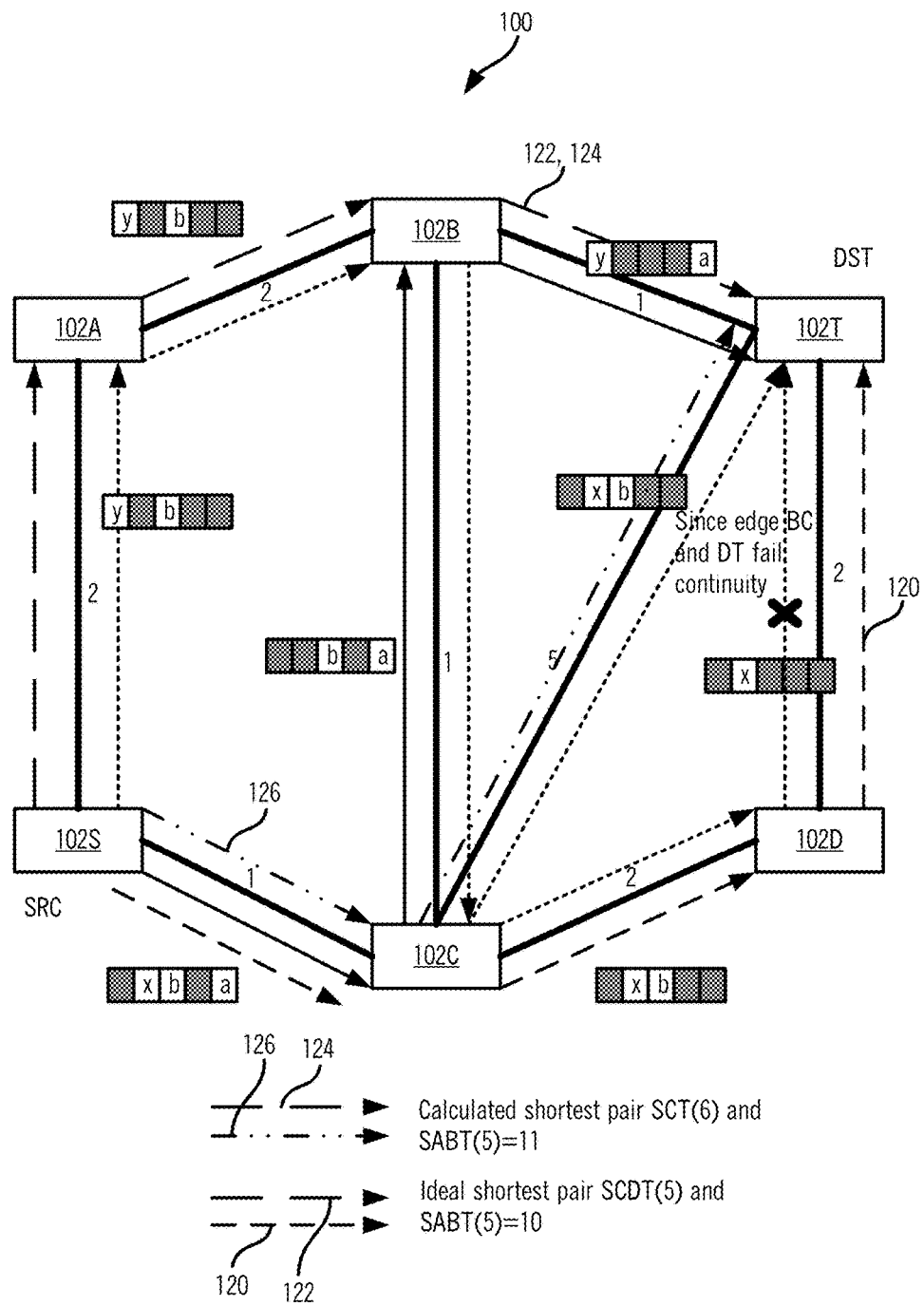
Figure 6:
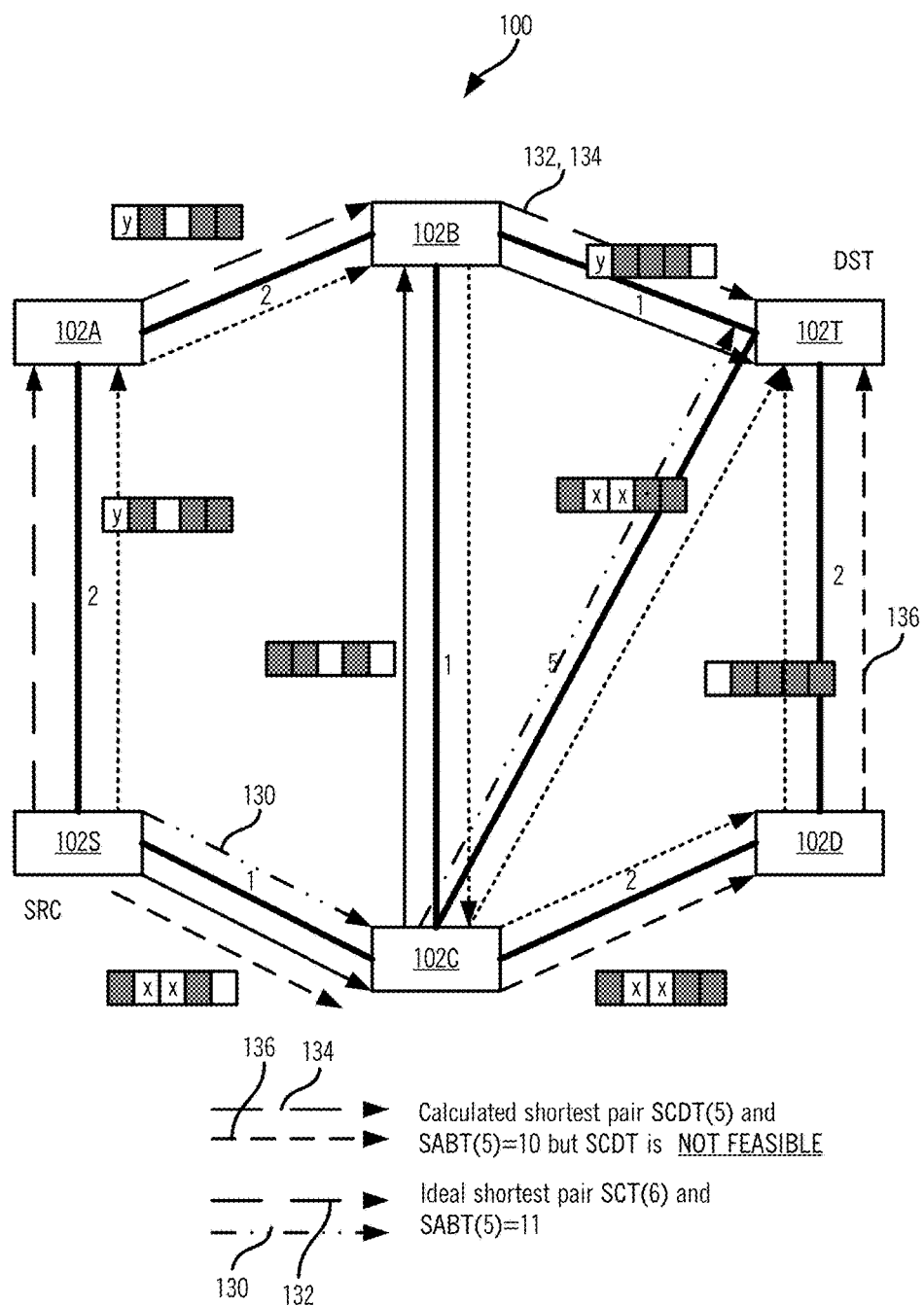

Referring to FIGS. 4, 5, and 6, in exemplary embodiments, network diagrams illustrate a network 100 with nodes 102A, 102B, 102C, 102D, 102S, 102T for describing disjoint path computation in an optical network. FIGS. 4, 5, and 6 depict the non-optimality or non-feasibility of solutions if the constraints are applied either along the two Dijkstra iterations or at the end of the two iterations. In this example, the node 102S is the source, i.e., designed as the edge s and the node 102T is the destination, i.e., designated as the edge t. Links 104 in the network 100 are labeled with associated costs (for ease of description, the links 104 are references based on the adjacent nodes), i.e., a link 102A-102B has a cost of 2, a link 102B-102T has a cost of 1, a link 102A-102S has a cost of 2, a link 102S-102C has a costs of 1, a link 102C-102D has a cost of 2, a link 102D-102T has a cost of 2, a link 102B-102C has a cost of 1, and a link 102C-102T has a cost of 5. In addition to the edges (the nodes 102) and the vertices (the links), the network diagrams include a table 106 of the spectrum which is shown to visualize optical spectrum on the links (either fixed grid, flex grid, or gridless). In a DWDM network, such as the network 100, a path is only viable between s and t in there is a contiguous spectrum, i.e., in table 106, along the path.

In FIGS. 4, 5, and 6, table 106 shows five boxes, for illustration purposes. Those of ordinary skill in the art understand the links 104 can have multiple wavelengths, e.g., 88 at 50 GHz, or portions of the spectrum, e.g., between 1530-1565 nm. In table 106, shaded boxes represent unavailable wavelengths or spectrum, i.e., used/allocated, and unshaded boxes represent available wavelengths or spectrum. The labels in the table 106 boxes of "x" and "y" signify the optimal choice of the spectrum on the optimal disjoint pair, and the other labels "a" and "b" represent other available spectrum.

There are two problems with the conventional Suurballe's algorithm in DWDM networks with a requirement for wavelength continuity, namely one may not get a solution when one is available, and one may get a sub-optimal solution. FIGS. 4 and 5 show one approach where wavelength continuity is applied at each Dijkstra iteration within Suurballe's algorithm, and FIG. 6 shows an approach where wavelength continuity is applied at the end of the two Dijkstra iterations within Suurballe's algorithm. Unfortunately, neither of these approaches work since the constraint of wavelength continuity is not additive in nature. If the constraint is non-additive, Suurballe's algorithm falls short; thus, the systems and methods solve the problem in a different manner for DWDM networks since wavelength continuity is not additive in nature.

In FIG. 4, there is an available disjoint path with continuous wavelengths, namely a first path 110 with wavelength "x" between the nodes 102S, 102C, 102D, 102T and a second path 112 with a wavelength "y" between the nodes 102S, 102A, 102B, 102T. Note, while the "x" is available between the nodes 102C, 102T and between the nodes 102C, 102D, 102T, these links 104 have high costs, namely a cost or 5 and 4, respectively. When Suurballe's algorithm is run paths 114, 116 are computed, the calculated shortest path 114 has no shortest pair and is declared not feasible. The links 102B-102C and 102A-102B fail continuity because only wavelength "a" is available on link 102B-102C which is not available on link 102A-102B. Thus, FIG. 4 illustrates a situation where the conventional Suurballe's algorithm fails to yield a solution when one does exist.

In FIG. 5, there is a different wavelength distribution in the tables 106 from FIG. 4, and there is an available and optimal disjoint path with continuous wavelengths, namely a first path 120 with wavelength "x" between the nodes 102S, 102C, 102D, 102T and a second path 122 with a wavelength "y" between the nodes 102S, 102A, 102B, 102T. Applying conventional Suurballe's algorithm while applying the continuity constraint between Dijkstra iterations yields a first path 124 between the nodes 102S, 102A, 102B, 102T with a cost of 5 and a second path 126 between the nodes 102S, 102C, 102T, whereas the shortest pair should be the paths 120, 122.

In FIG. 6, there is also a slightly different wavelength distribution in the tables 106 from FIGS. 4 and 5 and there is an available disjoint path with continuous wavelengths, namely a first path 130 with wavelength "x" between the nodes 102S, 102C, 102T and a second path 132 with a wavelength "y" between the nodes 102S, 102A, 102B, 102T. Applying conventional Suurballe's algorithm while applying the continuity constraint at the end of the Dijkstra iterations yields a first path 134 between the nodes 102S, 102A, 102B, 102T and a second path 136 between the nodes 102S, 102C, 102D, 102T. The path 136 is not feasible after applying the continuity constraint.

Disjoint Path Computation—Graph Definitions

Figure 7:
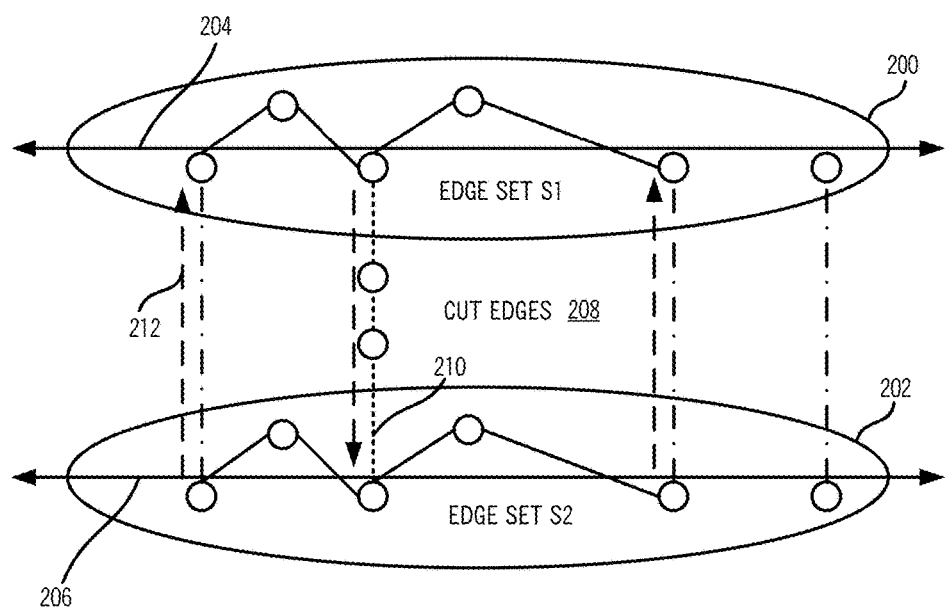
FIG. 7 is a graph diagram illustrates various graph concepts used herein for the disjoint path computation systems and methods.

Referring to FIG. 7, in an exemplary embodiment, a graph diagram illustrates various graph concepts used herein for the disjoint path computation systems and methods. There are two edge sets S1 200, S2 202 which represent a set of edges for each of the separate disjoint paths, namely the edge set S1 200 is used first to determine a first path 204 and the edge set S2 202 is used second to determine a second path 206. Cut edges 208 are edges between the two edge sets 200, 202 which are common to both paths 204, 206 in Suurballe's algorithm. A cut edge augmenting path segment 210 is a path between the two edge sets 200, 202. Finally, there is an alternating path 212 between the cut edges 208 and the non-cut edges.

Figure 8:
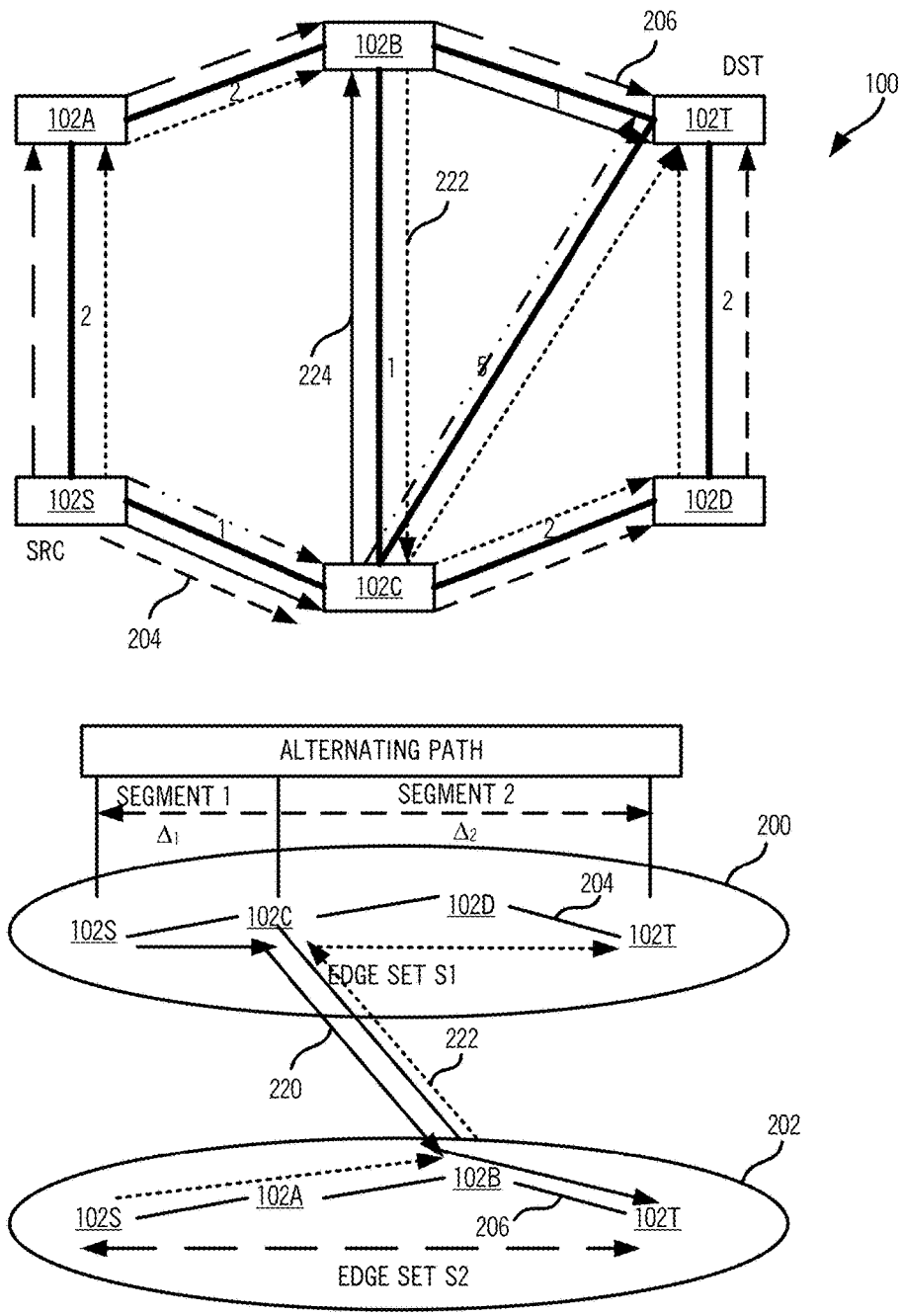
FIG. 8 is a network diagram of the network of FIGS. 4, 5, and 6 along with a graph diagram using the graph concepts of FIG. 7 applied to disjoint paths through the network of FIGS. 4, 5, and 6 between the source and destination nodes.

Referring to FIG. 8, in an exemplary embodiment, a network diagram illustrates the network 100 along with a graph diagram using the graph concepts of FIG. 7 applied to disjoint paths through the network 100 between the nodes 102S, 102T. Here, the edge set 200 includes the nodes 102S, 102C, 102D, 102T and the edge set 202 includes the nodes 102S, 102A, 102B, 102T, i.e., the nodes 102 are the edges. The first path 204 is between the 102S, 102C, 102D, 102T and the second path 206 is between the 102S, 102A, 102B, 102T, which are disjoint alternating paths. There are also alternating paths 220, 222 between the edge sets 200, 202, and the alternating paths are referred to herein as $P_1$ for path 220 and $P_2$ for path 222.

From these graphs and definitions, the following insights apply: the continuity constraint need not apply on cut edges 208 and cut-edge augmenting path segments 210; the continuity constraint needs to be applied only amongst alternating path segments of the two paths 220, 222; and these rules hold even for the network with no cut edges.

Disjoint Path Computation Process

Figure 9A:
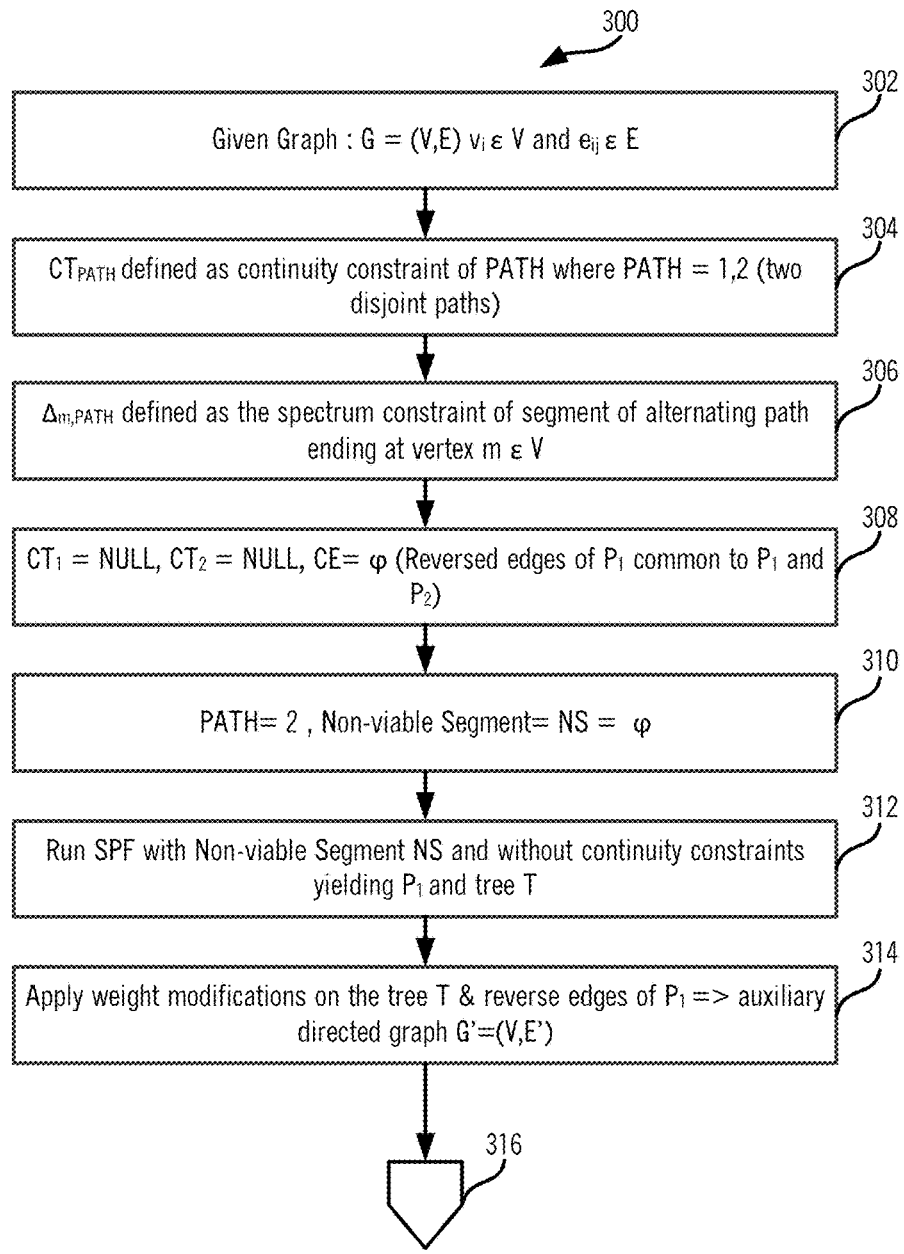
FIGS. 9A and 9B are definitions and a description of a disjoint path computation process for finding disjoint paths given the continuity constraint described herein.
Figure 9B:
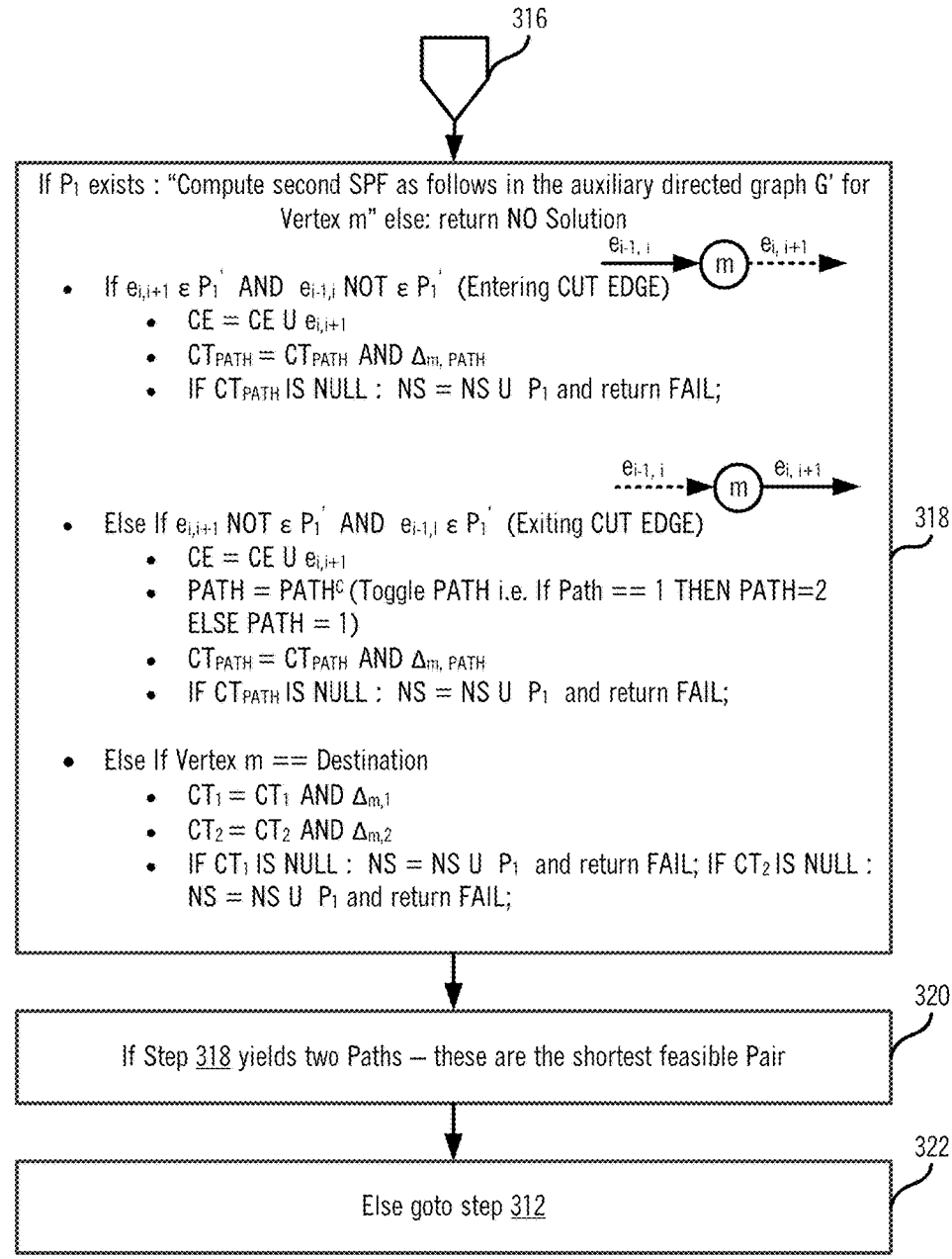

Referring to FIGS. 9A and 9B, in an exemplary embodiment, a definitions and description illustrate a disjoint path computation process 300 for finding disjoint paths given the continuity constraint described herein. Specifically, the disjoint path computation process 300 modifies Suurballe's algorithm to support the continuity constraint. For a given graph, G=(V, E) $v_i \varepsilon V$ and $e_{ij} \varepsilon E$ (step 302), $CT_{PATH}$ is defined as a Continuity Constraint (CT) of PATH where PATH=1, 2 (two disjoint paths) (step 304). Here, G=graph, V=vertices (nodes), E=edges (links), each $v_i$ (which is vertex i) is an element of V and each $e_{ij}$ is an element in E (which is an edge connecting vertex i to vertex j), and $CT_{PATH}$ is a definition of the continuity constraint (CT), i.e., wavelength or spectrum availability on the edges. $\Delta_{m,PATH}$ is defined as the spectrum constraint of a segment of alternating path ending at vertex m$\varepsilon$V (step 306). Specifically, the spectrum constraint defines the available and unavailable spectrum of a segment of alternating path ending at vertex m.

The process 300 starts with $CT_1$=NULL, $CT_2$=NULL, CE=$\phi$ (Reversed edges of $P_1$ common to $P_1$ and $P_2$) (CE=cut edges) (step 308) and PATH=2, Non-viable Segment=NS=$\phi$ (step 310). The process 300 includes running SPF with Non-Viable Segment NS and without continuity constraints yielding $P_1$ and tree T (step 312). Next, the process 300 includes applying weight modifications on the tree T and reversing edges of $P_1$=>an auxiliary directed graph G'=(V, E') is formed (step 314).

Next, a connector 316 in FIG. 9A points to FIG. 9B to continue the process 300. At a step 318, the process 300, if $P_1$ exists, includes computing a second SPF as follows in the auxiliary directed graph G' for Vertex m, and if P1 does not exist, no solution is returned (step 318).

The second SPF is performed as follows based on vertex m. First, if $e_{i,i+1} \varepsilon P_1'$ AND $e_{i-1,1}$ NOT$\varepsilon P_1'$ (Entering a CUT EDGE from vertex m)—CE=CE U $e_{i,i+1}$, $CT_{PATH}$=$CT_{PATH}$ AND $\Delta_{m,PATH}$, and IF $CT_{PATH}$ IS NULL: NS=NS U $P_1$ and return FAIL and proceed to step 320;

Else If $e_{i,i+1}$ NOT$\varepsilon P_1'$ AND $e_{i-1,i} \varepsilon P_1'$ (Exiting a CUT EDGE from vertex m)—CE=CE U $e_{i,i+1}$, PATH=PATH$^C$ (Toggle PATH i.e. If Path==1 THEN PATH=2 ELSE PATH=1), $CT_{PATH}$=$CT_{PATH}$ AND $\Delta_{m,PATH}$, and IF $CT_{PATH}$ IS NULL: NS=NS U $P_1$ and return FAIL;

Else If Vertex m==Destination—$CT_1$=$CT_1$ AND $\Delta_{m,1}$, $CT_2$=$CT_2$ AND $\Delta_{m,2}$, and IF $CT_1$ IS NULL: NS=NS U $P_1$ and return FAIL; IF $CT_2$ IS NULL: NS=NS U $P_1$ and return FAIL.

If step 318 yields two paths, these are the two shortest feasible paths (step 320), and if not, the process returns to step 312 with the current variables set based on above.

In the process 300, steps 302-310 are initialization steps, steps 312-314 involve computing the first path, and steps 316-322 involve computing the second path.

Figure 10:
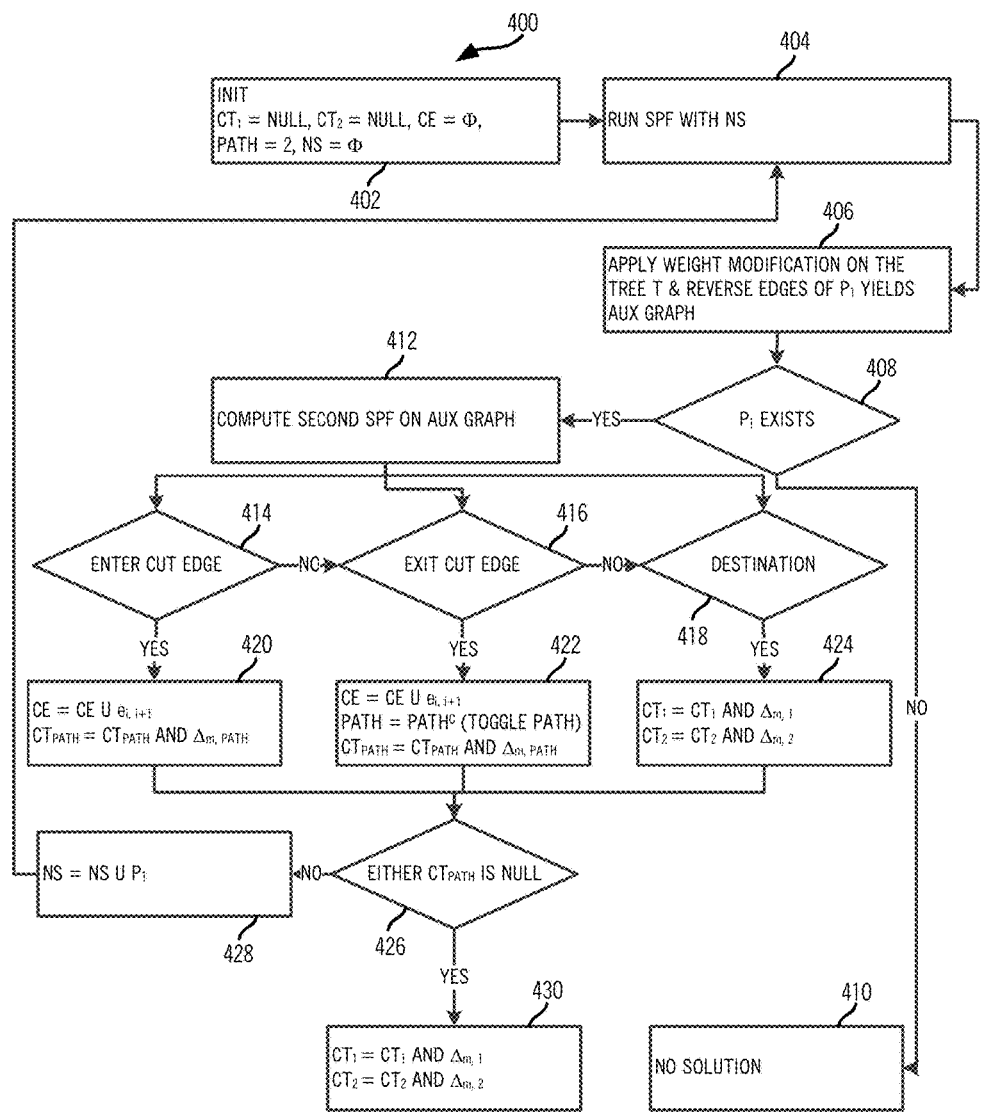
FIG. 10 is a flowchart of another disjoint path computation process for finding disjoint paths given the continuity constraint described herein.

Referring to FIG. 10, in an exemplary embodiment, a flowchart illustrates another disjoint path computation process 400 for finding disjoint paths given the continuity constraint described herein. The processes 300, 400 are similar and presented in different form.

The process 400 includes initialization with $CT_1$=NULL, $CT_2$=NULL, CE=$\Phi$, PATH=2, NS=$\Phi$ (step 402) and running SPF with NS to obtain the first path, $P_1$ (step 404). The process 400 includes applying weight modification on the tree T and reversing edges of $P_1$ to yield the auxiliary graph, G' (step 406). If $P_1$ does not exist (step 408), there is no solution (step 410) and if $P_1$ does exist (step 408), the process 400 includes computing a second SPF on the auxiliary graph (step 412).

After the step 412, the process 400 determines whether it is entering a cut edge (step 414), exiting a cut edge (step 416), or at the destination (step 418). If entering a cut edge (step 414), the process 400 includes setting CE=CE U $e_{i,i+1}$ and $CT_{PATH}$=$CT_{PATH}$ and $\Delta_{m,PATH}$ (step 420). If existing a cut edge (step 416), the process 400 includes setting CE=CE U $e_{i,i+1}$, PATH=PATH$^C$ (toggle PATH), and $CT_{PATH}$=$CT_{PATH}$ and $\Delta_{m,PATH}$ (step 422). If at the destination (step 418), the process 400 includes setting $CT_1$=$CT_1$ and $\Delta_{m,1}$ and $CT_2$=$CT_2$ and $\Delta_{m,2}$ (step 424).

After steps 420, 422, 424, the process 400 checks if either $CT_{PATH}$ is NULL (step 426), and if not, NS=NS U $P_1$ (step 428) and the process 400 returns to step 404. If either $CT_{PATH}$ is NULL (step 426), the process 400 finds $CT_1$=$CT_1$ and $\Delta_{m,1}$ and $CT_2$=$CT_2$ and $\Delta_{m,2}$ and ends (step 430).

Figure 11:
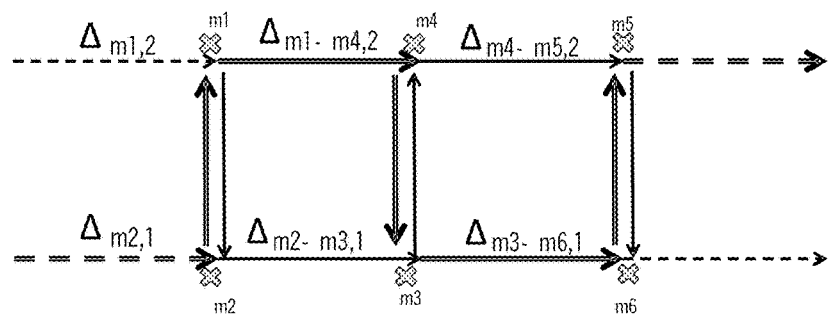
FIG. 11 is a graph diagram of a trap topology.

Referring to FIG. 11, in an exemplary embodiment, a graph diagram illustrates a trap topology. The ladder network in FIG. 11 exhibits the example of trap topology and how continuity constraint is applied by before-mentioned processes 300, 400. Eventually, $CT_1$ and $CT_2$ provide two disjoint paths with feasible continuity constraints. Here each $\Delta_{m,PATH}$ value need not be just one edge but could be a path segment of multiple edges.

The processes 300, 400 are executing Suurballe's algorithm and are modifying weights to get the minimal disjoint pair, on every iteration. If there are no CUT EDGES, the processes 300, 400 is equivalent to Suurballe's algorithm with continuity constraint applied afterward. If there are CUT EDGES, the continuity constraints are only applied to the alternating path segments of the two disjoint paths and thus allows an RSA/RWA constrained disjoint pair computation. If a feasible minimal solution is not found, then the processes 300, 400 runs again to yield the next best shortest path by not using the Non-Viable Segment (NS). Thus, the processes 300, 400 never go back to compute the same Shortest path again.

Example Disjoint Path Computation

Figure 12A:
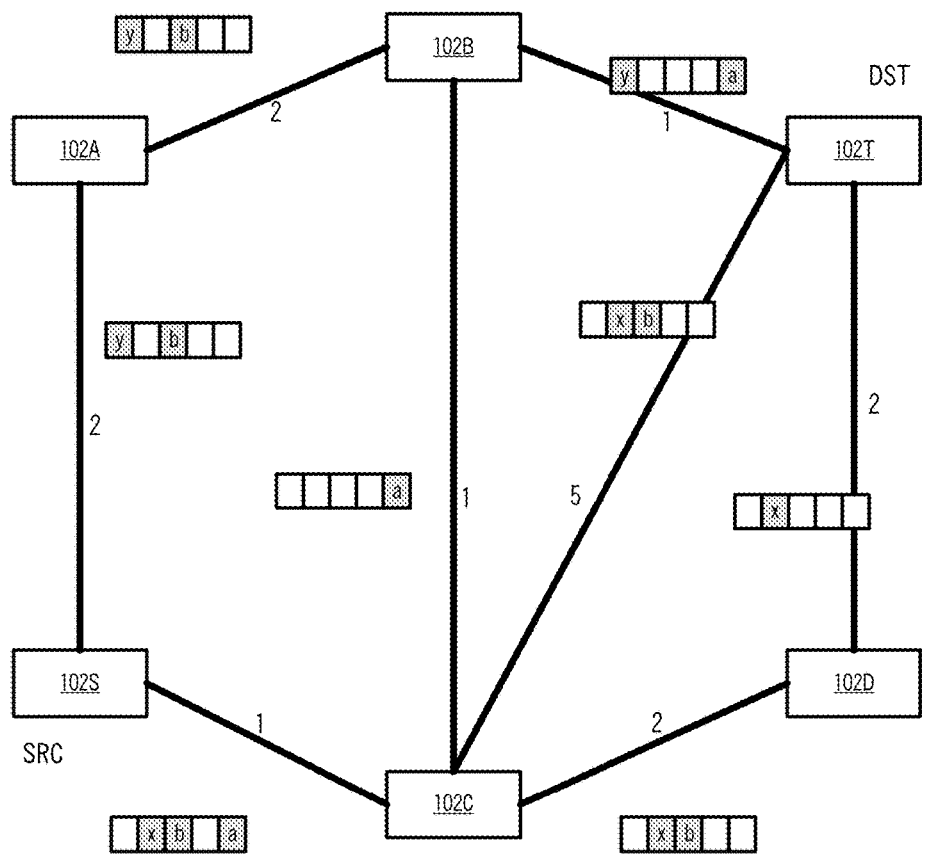
FIGS. 12A-12E are network diagrams of an exemplary operation of the disjoint path computation on the network.
Figure 12B:
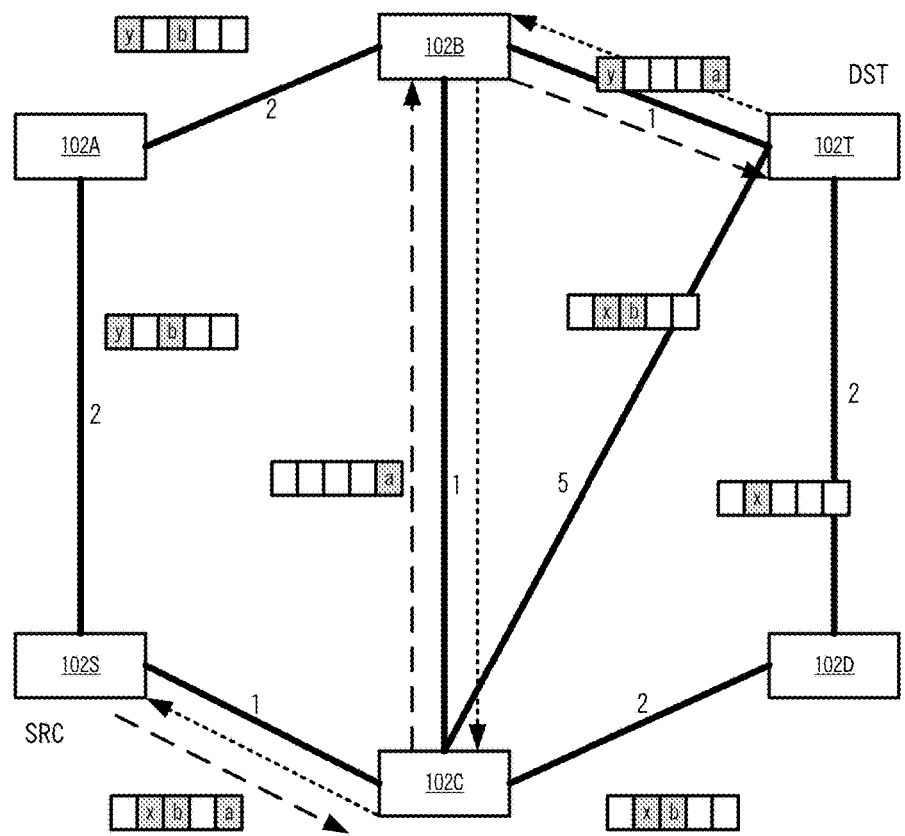
Figure 12C:
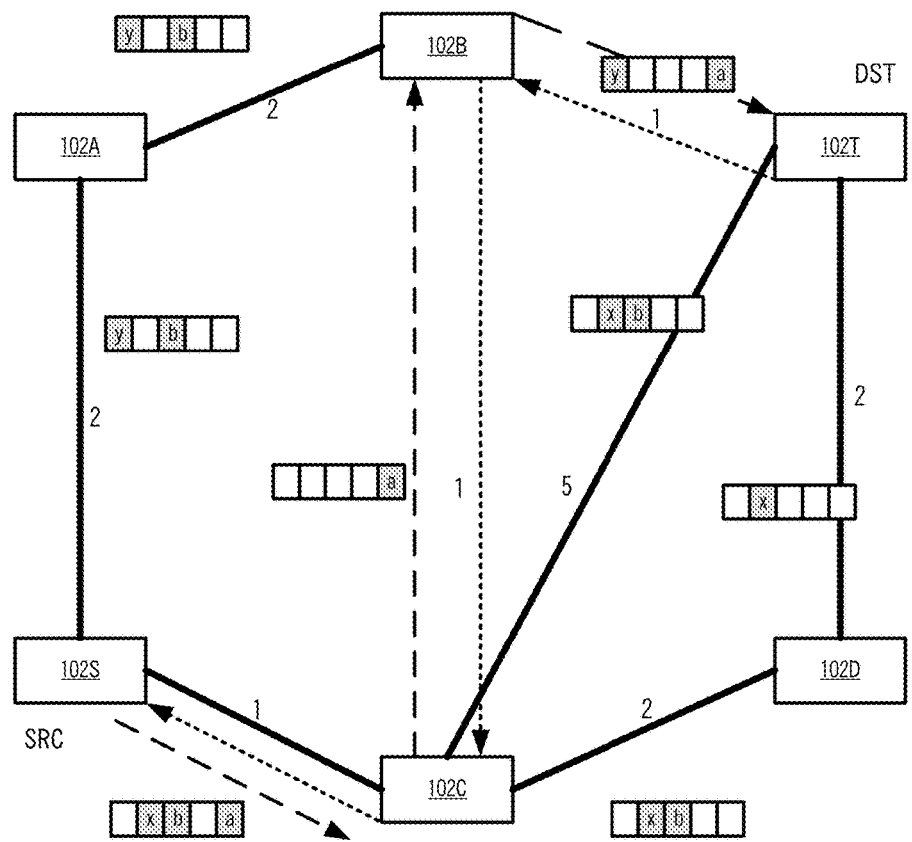
Figure 12D:
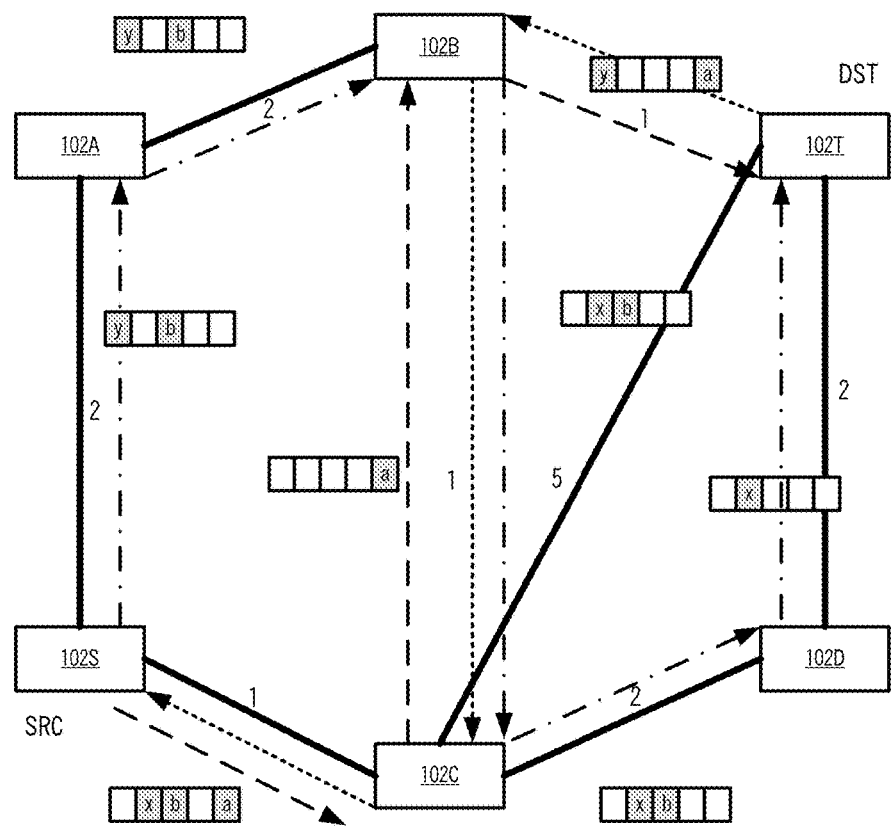
Figure 12E:
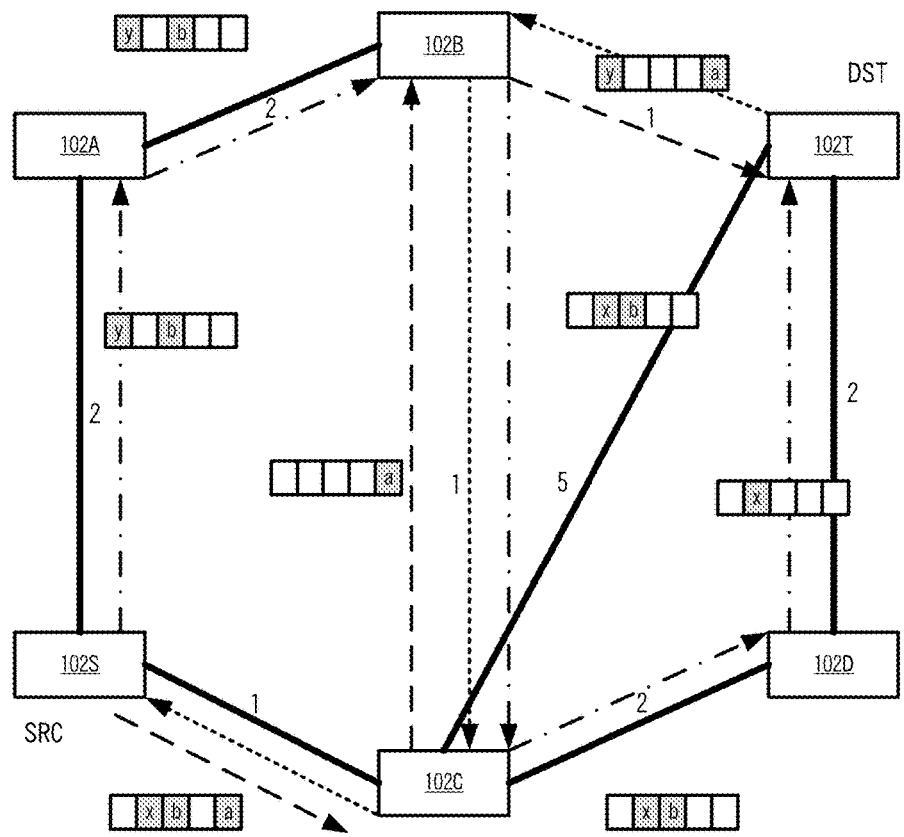

Referring to FIGS. 12A-12E, in an exemplary embodiment, network diagrams illustrate an exemplary operation of the disjoint path computation on the network 100. In particular, in FIG. 12A, the edges $E_{BC}$ and $E_{AB}$ fail continuity constraints due to wavelength availability. In FIG. 12B, a first SPF is computed on edges $E_{SC}$, $E_{CB}$, $E_{BT}$. In FIG. 12C, the auxiliary graph is shown. In FIG. 12D, the second SPF is computed with $CT_2(SAB)$ and $CT_1(SC)$ with the associated constraints shown.

Disjoint Path Computation Process

Figure 13:
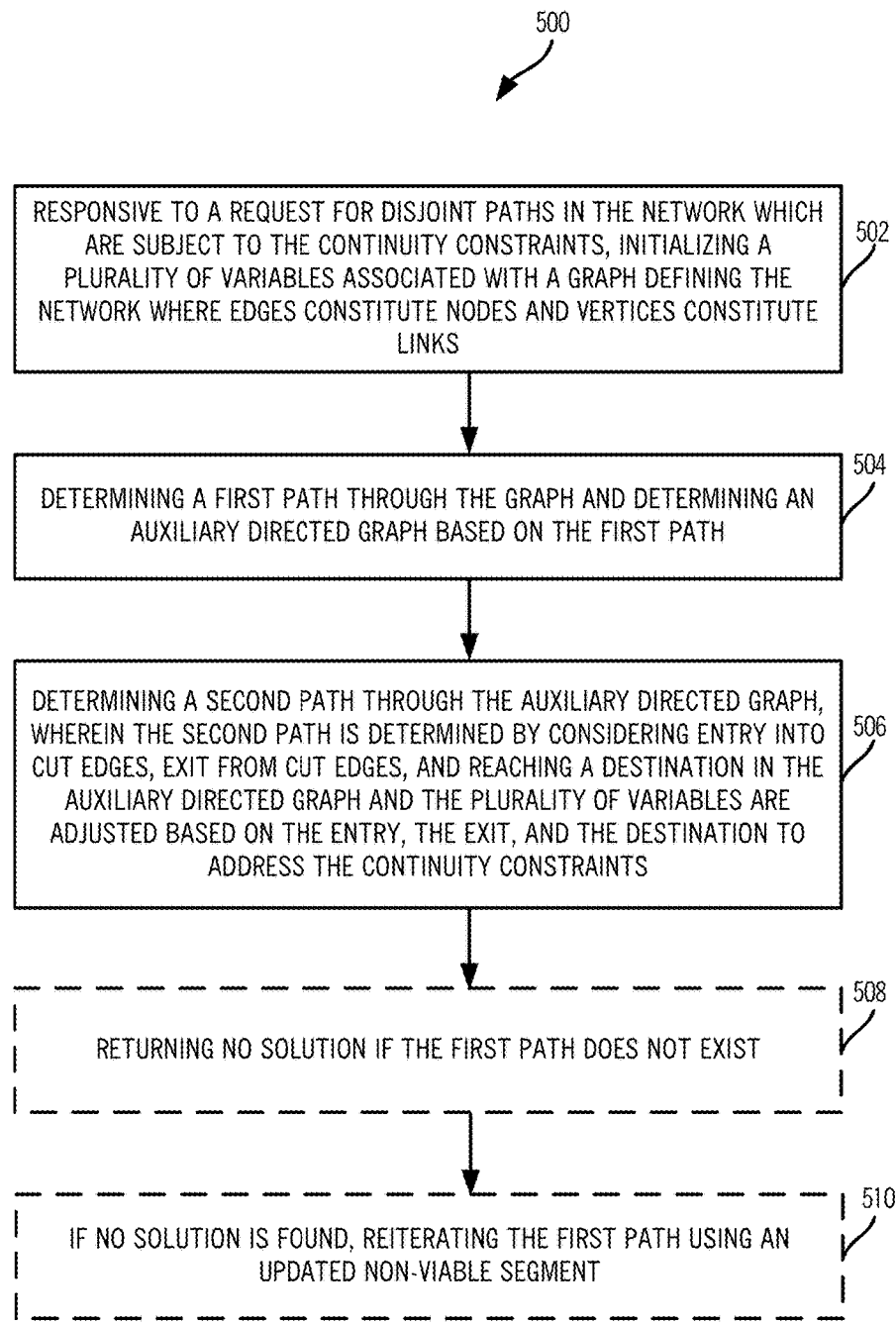
FIG. 13 is a flowchart of another disjoint path computation process for finding disjoint paths given the continuity constraint described herein.

Referring to FIG. 13, in an exemplary embodiment, a flowchart illustrates another disjoint path computation process 500 for finding disjoint paths given the continuity constraint described herein. The disjoint path computation process 500 is computer-implemented such as through a Path Computation Element (PCE), network element or node, server, planning system, NMS, EMS, SDN controller or application, or the like. The disjoint path computation process 500 includes, responsive to a request for disjoint paths in the network which are subject to the continuity constraints, initializing a plurality of variables associated with a graph defining the network where edges constitute nodes and vertices constitute links (step 502); determining a first path through the graph and determining an auxiliary directed graph based on the first path (step 504); and determining a second path through the auxiliary directed graph, wherein the second path is determined by considering entry into cut edges, exit from cut edges, and reaching a destination in the auxiliary directed graph and the plurality of variables are adjusted based on the entry, the exit, and the destination to address the continuity constraints (step 506). The disjoint path computation process 500 can include returning no solution if the first path does not exist (step 508). The disjoint path computation process 500 can include if no solution is found, reiterating the first path using an updated Non-Viable Segment.

The continuity constraints can include one of wavelength and spectrum continuity in the network. The determining the first path and determining the second path can utilize Shortest Path First (SPF). The plurality of variables can include a set of Cut Trees (CT), $CT_1$, $CT_2$, and wherein the set of CT are modified traversing the auxiliary directed graph, and subsequent to reaching the destination, if the set of CT are not empty, the set of CT form the disjoint paths. The first path can be determined using a Non-Viable Segment without the continuity constraints to yield the first path, $P_1$, and a tree, T, and wherein the auxiliary directed graph can be determined by applying weight modifications to the tree, T, and reversing edges of the first path, $P_1$. An alternating path and cut edges are used to apply the continuity constraints for both the disjoint paths during the determining the second path.

In another exemplary embodiment, an apparatus adapted to compute disjoint paths in a network considering continuity constraints includes circuitry adapted to initialize a plurality of variables associated with a graph defining the network where edges constitute nodes and vertices constitute links responsive to a request for disjoint paths in the network which are subject to the continuity constraints; circuitry adapted to determine a first path through the graph and determining an auxiliary directed graph based on the first path; and circuitry adapted to determine a second path through the auxiliary directed graph, wherein the second path is determined by considering entry into cut edges, exit from cut edges, and reaching a destination in the auxiliary directed graph and the plurality of variables are adjusted based on the entry, the exit, and the destination to address the continuity constraints.

In a further exemplary embodiment, a system adapted to compute disjoint paths in a network considering continuity constraints includes a network interface and a processor communicatively coupled to one another; and memory storing instructions that, when executed, cause the processor to, responsive to a request, via the network interface, for disjoint paths in the network which are subject to the continuity constraints, initialize a plurality of variables associated with a graph defining the network where edges constitute nodes and vertices constitute links, determine a first path through the graph and determining an auxiliary directed graph based on the first path, and determine a second path through the auxiliary directed graph, wherein the second path is determined by considering entry into cut edges, exit from cut edges, and reaching a destination in the auxiliary directed graph and the plurality of variables are adjusted based on the entry, the exit, and the destination to address the continuity constraints.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A computer-implemented method for computing disjoint paths in a network considering continuity constraints, the computer-implemented method comprising:
    responsive to a request for disjoint paths in the network which are subject to the continuity constraints, initializing a plurality of variables associated with a graph defining the network where edges constitute nodes and vertices constitute links;
    determining a first path through the graph using a Non-Viable Segment without the continuity constraints to yield the first path, $P_1$, and a tree, T;
    determining an auxiliary directed graph based on the first path by applying weight modifications to the tree, T, and reversing edges of the first path, $P_1$;
    determining a second path through the auxiliary directed graph, wherein the second path is determined by considering entry into cut edges, exit from cut edges, and a destination in the auxiliary directed graph and the plurality of variables are adjusted based on the entry, the exit, and the destination to address the continuity constraints; and
    causing implementation of the determined first path and the determined second path in the network.

2. The computer-implemented method of claim 1, wherein the continuity constraints comprise one of wavelength and spectrum continuity in the network.

3. The computer-implemented method of claim 1, further comprising:
    returning no solution if the first path does not exist.

4. The computer-implemented method of claim 1, wherein the determining the first path and determining the second path utilize Shortest Path First (SPF).

5. The computer-implemented method of claim 1, wherein the plurality of variables comprise a set of Continuity Constraints (CT) for each of paths $CT_1$, $CT_2$, and wherein the set of CT are modified traversing the auxiliary directed graph during the determining the second path, and subsequent to reaching the destination, if the set of CT are not empty, the set of CT form the disjoint paths.

6. The computer-implemented method of claim 1, wherein an alternating path and cut edges are used to apply the continuity constraints for both the disjoint paths during the determining the second path.

7. The computer-implemented method of claim 1, further comprising:
    if no solution is found, reiterating the first path using an updated Non-Viable Segment.

8. The computer-implemented method of claim 1, wherein the continuity constraints are applied only amongst alternating path segments of the first path and the second path.

9. An apparatus adapted to compute disjoint paths in a network considering continuity constraints, the apparatus comprising:
    circuitry adapted to initialize a plurality of variables associated with a graph defining the network where edges constitute nodes and vertices constitute links responsive to a request for disjoint paths in the network which are subject to the continuity constraints;
    circuitry adapted to determine a first path through the graph using a Non-Viable Segment without the continuity constraints to yield the first path, $P_1$, and a tree, T;
    circuitry adapted to determine an auxiliary directed graph based on the first path by applying weight modifications to the tree, T, and reversing edges of the first path, $P_1$; and
    circuitry adapted to determine a second path through the auxiliary directed graph, wherein the second path is determined by considering entry into cut edges, exit from cut edges, and a destination in the auxiliary directed graph and the plurality of variables are adjusted based on the entry, the exit, and the destination to address the continuity constraints,
    wherein each of the circuitry comprises hardware.

10. The apparatus of claim 9, wherein the continuity constraints comprise one of wavelength and spectrum continuity in the network.

11. The apparatus of claim 9, wherein the first path and the second path are determined using Shortest Path First (SPF).

12. The apparatus of claim 9, wherein the plurality of variables comprise a set of Continuity Constraints (CT) for each of paths $CT_1$, $CT_2$, and wherein the set of CT are modified traversing the auxiliary directed graph during the determining the second path, and subsequent to reaching the destination, if the set of CT are not empty, the set of CT form the disjoint paths.

13. The apparatus of claim 9, further comprising:
    circuitry adapted to reiterate the first path using an updated Non-Viable Segment if no solution is found.

14. A system adapted to compute disjoint paths in a network considering continuity constraints, the system comprising:
    a network interface and a processor communicatively coupled to one another; and
    memory storing instructions that, when executed, cause the processor to
        responsive to a request, via the network interface, for disjoint paths in the network which are subject to the continuity constraints, initialize a plurality of variables associated with a graph defining the network where edges constitute nodes and vertices constitute links,
        determine a first path through the graph using a Non-Viable Segment without the continuity constraints to yield the first path, $P_1$, and a tree, T, determine an auxiliary directed graph based on the first path by applying weight modifications to the tree, T, and reversing edges of the first path, $P_1$, and determine a second path through the auxiliary directed graph, wherein the second path is determined by considering entry into cut edges, exit from cut edges, and a destination in the auxiliary directed graph and the plurality of variables are adjusted based on the entry, the exit, and the destination to address the continuity constraints.

15. The system of claim 14, wherein the continuity constraints comprise one of wavelength and spectrum continuity in the network.

16. The system of claim 14, wherein the plurality of variables comprise a set of Continuity Constraints (CT) for each of paths $CT_1$, $CT_2$, and wherein the set of CT are modified traversing the auxiliary directed graph during the determining the second path, and subsequent to reaching the destination, if the set of CT are not empty, the set of CT form the disjoint paths.

17. The system of claim 14, wherein the memory storing instructions that, when executed, further cause the processor to if no solution is found, reiterating the first path using an updated Non-Viable Segment.

* * * * *